United States Patent [19]
Gefen et al.

[11] Patent Number: 5,915,563
[45] Date of Patent: Jun. 29, 1999

[54] CONTAINER FOR COMPACT DISCS OR THE LIKE

[76] Inventors: Eldad Gefen, 49 Ptachya Street, Tel Aviv 69549; Arieh Gluch, 24 Hatchia Street, Holon 58403, both of Israel

[21] Appl. No.: 08/903,790

[22] Filed: Jul. 31, 1997

[51] Int. Cl.[6] .................................................. B65D 85/57
[52] U.S. Cl. ......................... 206/750; 206/754; 206/312
[58] Field of Search ................................ 206/45.2, 45.23, 206/45.21, 45.24, 45.25, 45.26, 232, 308.1, 751, 754, 755, 756, 745, 747, 748, 749, 750, 311, 312, 313

[56] References Cited

U.S. PATENT DOCUMENTS

| | | | |
|---|---|---|---|
| 2,951,583 | 9/1960 | Sanford | 206/754 X |
| 3,769,741 | 11/1973 | Hessler et al. | 206/750 X |

*Primary Examiner*—Jacob K. Ackun
*Attorney, Agent, or Firm*—Browdy and Neimark

[57] ABSTRACT

A container for storage and display of at least one essentially flat planar item, comprising three planar members including a base member, a cover and an item holding member which is intermediate between the base member and the cover. One end of the cover is folded about a first fold line at a rear end of the base member and about a second fold line to the item holding member. The cover is swingable about the two fold lines between an opened state and a closed state. The item holding member is pivotly connected to a front end of the base member along a third fold line, and comprises two portions pivotly connected to one another along a fourth fold line, and item holding means for holding the item such that at least a portion of the item is retained flush against one of the two portions of the item holding member. The fold lines are arranged such that in the closed state the first fold line is rearward with respect to the second fold line, so that during opening of the cover the first fold line slides to a position forward with respect the second fold line, giving rise to swinging of the two portions of the item holding member about the third fold line such that the item erects.

16 Claims, 13 Drawing Sheets

CONTAINER FOR COMPACT DISCS OR THE LIKE

FIELD AND BACKGROUND OF THE INVENTION

The present invention concerns a container for the storage and display of flat items such as compact discs, DVD discs, etc.

There are a variety of known containers for compact discs or other flat items. Such known containers are either substantially flat cases, such as cardboard envelopes, which hold the flat items and take a low storage space, but in which the flat item is not immediately visible and cannot be easily removed therefrom; or are somewhat larger cases, which take a larger storage space, but which have the capability of conveniently displaying the disc for removal when opened. Known containers for flat items are described in U.S. Pat. Nos. 4,620,630, 4,850,731, 5,096,055, 5,101,973, 5,154,284, 5,248,032, 5,460,265, 5,472,083, 5,522,500 and 5,575,387.

There is a need for a container which on the one hand is thin thus requiring low storage space, and on the other hand, provides for displaying and easy withdrawal of the flat item when opened. It is the object of the invention to provide such a container made at low cost and of environmentally friendly materials.

GENERAL DESCRIPTION OF THE INVENTION

The present invention provides a container for storage and display of at least one essentially flat planar item, such as compact discs. The storage and display container of the invention comprises three planar members including a base member, a cover and an item holding member which is intermediate between the base member and the cover; one end of the cover being folded about a first fold line at a rear end of the base member and about a second fold line to the item holding member, the cover being swingable about the two fold lines between an opened state and a closed state; the item holding member being pivotly connected to a front end of the base member along a third fold line, and comprising two portions pivotly connected to one another along a fourth fold line, and item holding means for holding the item such that at least a portion of the item is retained flush against one of the two portions of the item holding member; fold lines being arranged such that in the closed state the first fold line is rearward with respect to the second fold line, whereby during opening of the cover the first fold line slides to a position forward to said second fold line giving rise to swinging of the two portions of the item holding member about the third fold line whereby said item erects and is easily removable.

The term "fold line" as used herein the description and claims refers to an axis about which two adjoining portions are swingable with respect to one another, which portions are separate portions being hingedly connected to one another or integral porions foldable with respect to one another.

By a preferred embodiment of the invention, the base member, the cover and the item holding member, are made from a single, folded blank, which may be made of cardboard, of a plastic material, typically transparent, or any other material or a combination of different materials.

Still preferably all fold lines are essentially parallel one another.

The item holding member is preferably formed with a slit, adapted for insertion of a portion of the flat item, which slit extends between two side portions, with the fourth fold line formed in said two side portions. The arrangement is such that the flat item, once inserted to the slit, has at least a portion which projects outwardly such that once the container is opened and the flat item erects, said outwardly projecting portion is displayed and allows for easy removal of the flat item. The item holding member may comprise a pocket attached to the face of the item holding member facing said base member and having an opening facing the slit, whereby it is adapted to receive a portion of the flat item which is inserted through the slit.

In accordance with another embodiment, the item holding member has a pocket, formed on the face thereof facing the cover, the pocket having an opening directed towards the fourth fold line adapted to receive a portion of said planar item.

In accordance with one embodiment, said one end of the cover has two peripheral portions with, attached to or integral with corresponding portions at a rear end of the base, with said first fold line formed in said peripheral portions, and has a central portion attached to or integral with a corresponding central portion of the rear end of the item holding member, with the second fold line formed in said central portion. In accordance with another embodiment, said one end of the cover has a central portion attached to or integral with a corresponding central portion of a rear end of the base, with said first fold line formed in said central portion, and has two peripheral portions attached to or integral with corresponding peripheral portions at the rear end of the item holding member, with said second fold line formed in said peripheral portions.

The invention also provides a container for storage and display of two or more planar items. In such a container, there are a plurality of functional units, one for each items to be stored and displayed, with the base of one functional unit serving as the cover of the other. The two functional units may be in the same or in an opposite orientation.

The invention will now be illustrated in the following non specific embodiments shown in the annexed drawings.

BRIEF DESCRIPTION OF THE DRAWINGS

FIG. 1 shows an embodiment of a container of the invention, in three operational states: storage (FIG. 1A), partially open state (FIG. 1B) and fully open state (FIG. 1C);

FIG. 10 is a container similar to the container of FIG. 3 and comprising a wide front edge, the container shown in a close storage position (FIG. 10a) and in a partially open position (FIG. 10B);

DESCRIPTION OF SPECIFIC EMBODIMENTS

Figure 1A:
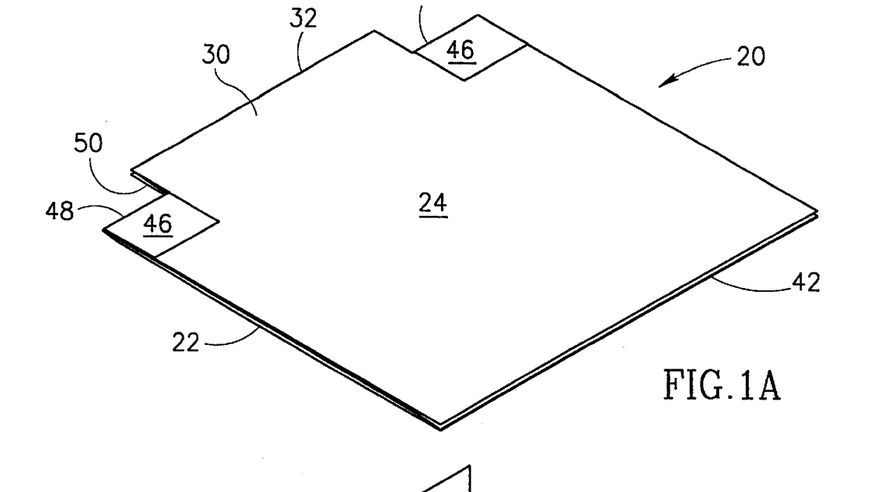
Figure 1B:
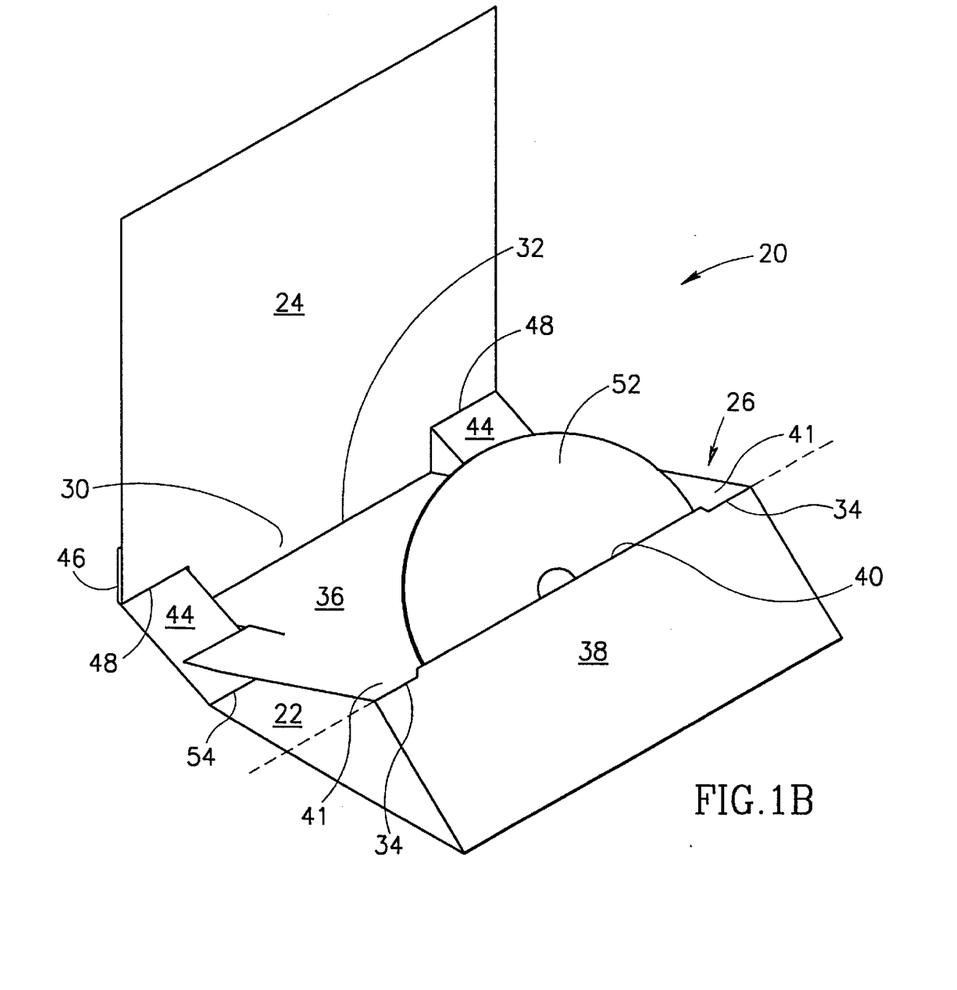
Figure 1C:
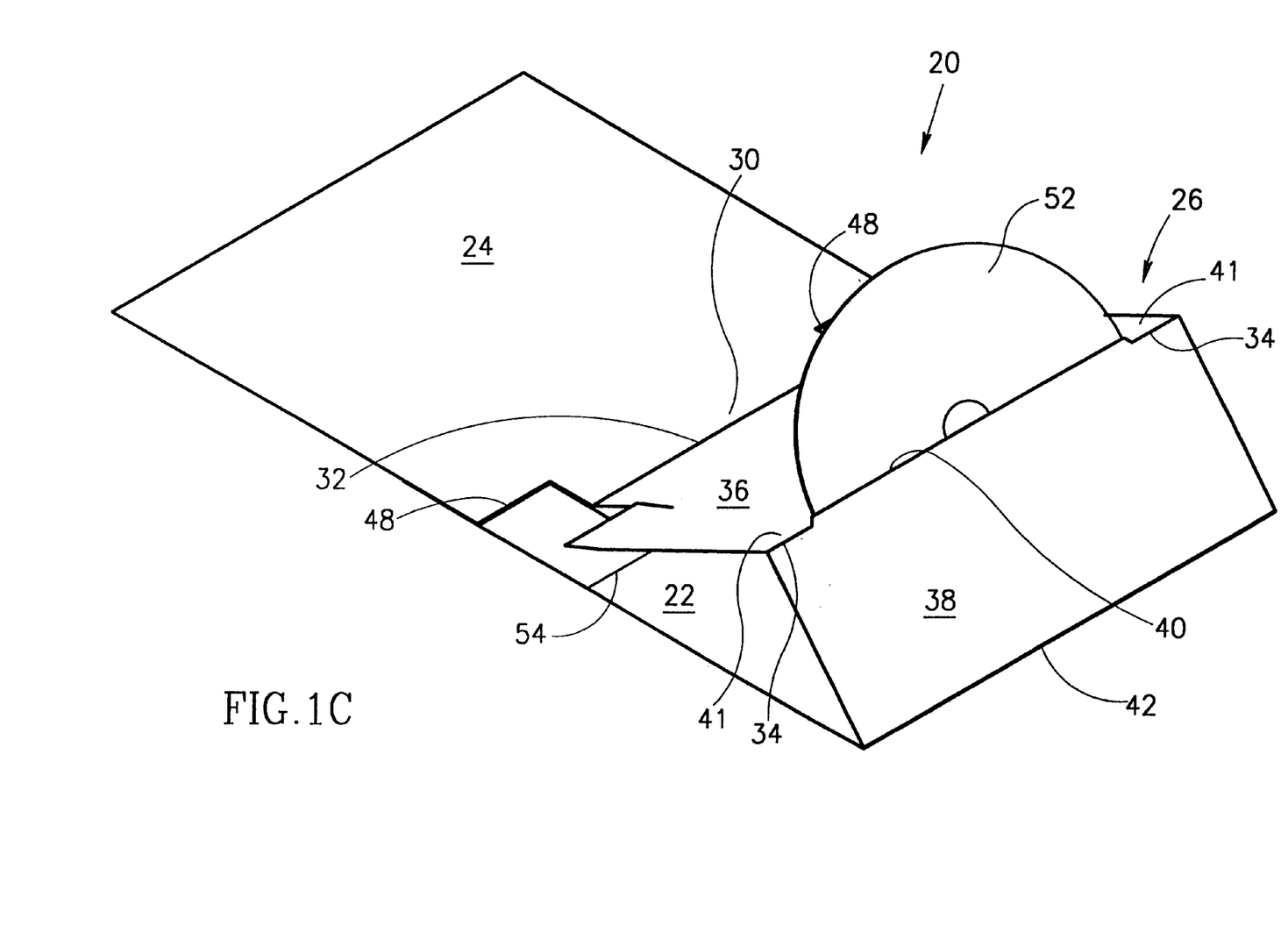

FIG. 1 shows a container 20, which is displayed in three states: a closed, storage state, shown in FIG. 1A; a partially open state, shown in FIG. 1B; and a fully open state, shown in FIG. 1C. FIG. 1D is a side view of this container at the state which is shown in FIG. 1B. Container 20, which is typically made of cardboard, a variety of plastic materials, etc. has a planar base member 22, a planar cover 24 and a planar item holding member 26. Cover 24 is integral with and connected at a central end portion 30 to item holding member 26, with the two being pivoted one with respect to another about a fold line 32. Item holding member 26 is formed with a fold line 34, separating member 26 into two portions 36 and 38. Item holding member is formed with a slit 40 extending between two peripheral portions 41 with fold line 34, formed in these peripheral portions. Item holding member 26 is integral with base member 22, with the two being in a pivoting relationship about a fold line 42. Base member 22 has two peripheral flaps 44 at an end thereof, opposite fold line 42, with a terminal attachment portion 46, defined by fold line 48, which is tightly fastened, e.g. by adhesion, to the upper face of cover member 24. As can further be seen in FIGS. 1A and 1D, base member 22 has a rearward extending central portion 50, overlapping the rear end of cover 30, in the closed state of the container.

Figure 1D:
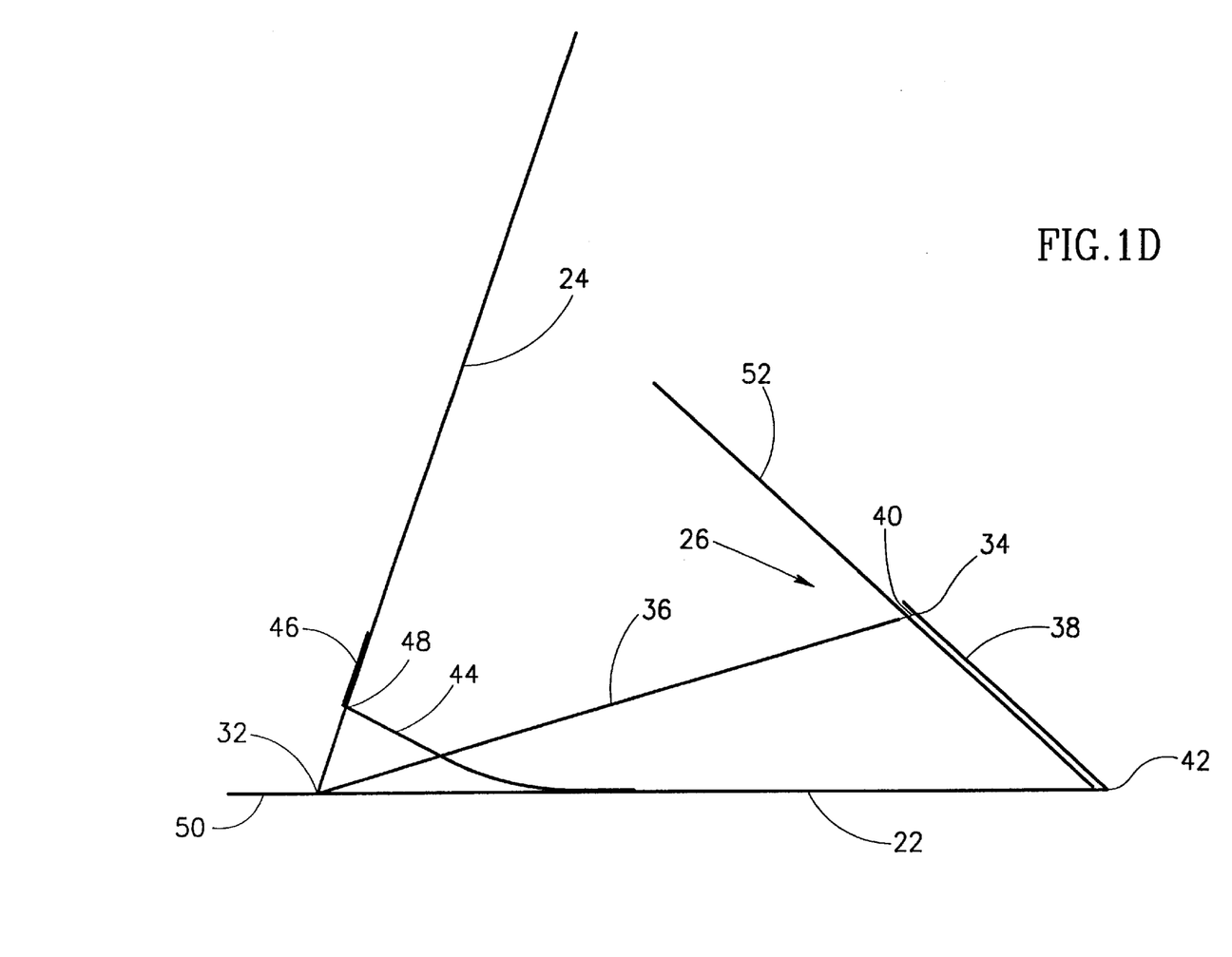
FIG. 1D is a side view of the container at the state shown in FIG. 1B.

As can also be seen in FIG. 1A, in the closed position, fold line 32 is rearward to fold line 48. When the cover 24 is opened to the state shown in FIG. 1B and 1D, fold line 32 slides forward over the rear portion 50 of base member 22 and pushes forward portion 36 of item holding member 26. As a result, portions 36 and 38 pivot against one another about fold line 34 and thereby item holding member assumes a triangular shape erecting the flat item, a compact disc in the illustrated embodiment, exposing a portion thereof permitting easy withdrawal, as can be seen in FIGS. 1B, 1C and 1D. In the fully open position shown in FIG. 1C, fold line 48 is rearward to fold line 32.

This arrangement in fact provides for two fully stable portions, this being the closed state seen in FIG. 1A and the open state seen in FIG. 1C. Consequently the cover is biased to one of these states.

The container comprises an optional auxiliary fold line 54, formed between flaps 44 and the remaining portion of base member 26. Alternatively, the relative angular movement of flap 44, vis-a-vis the remaining portion of base member 22 is permitted as a consequence of resiliency of the constituting material at this portion.

Figure 2:
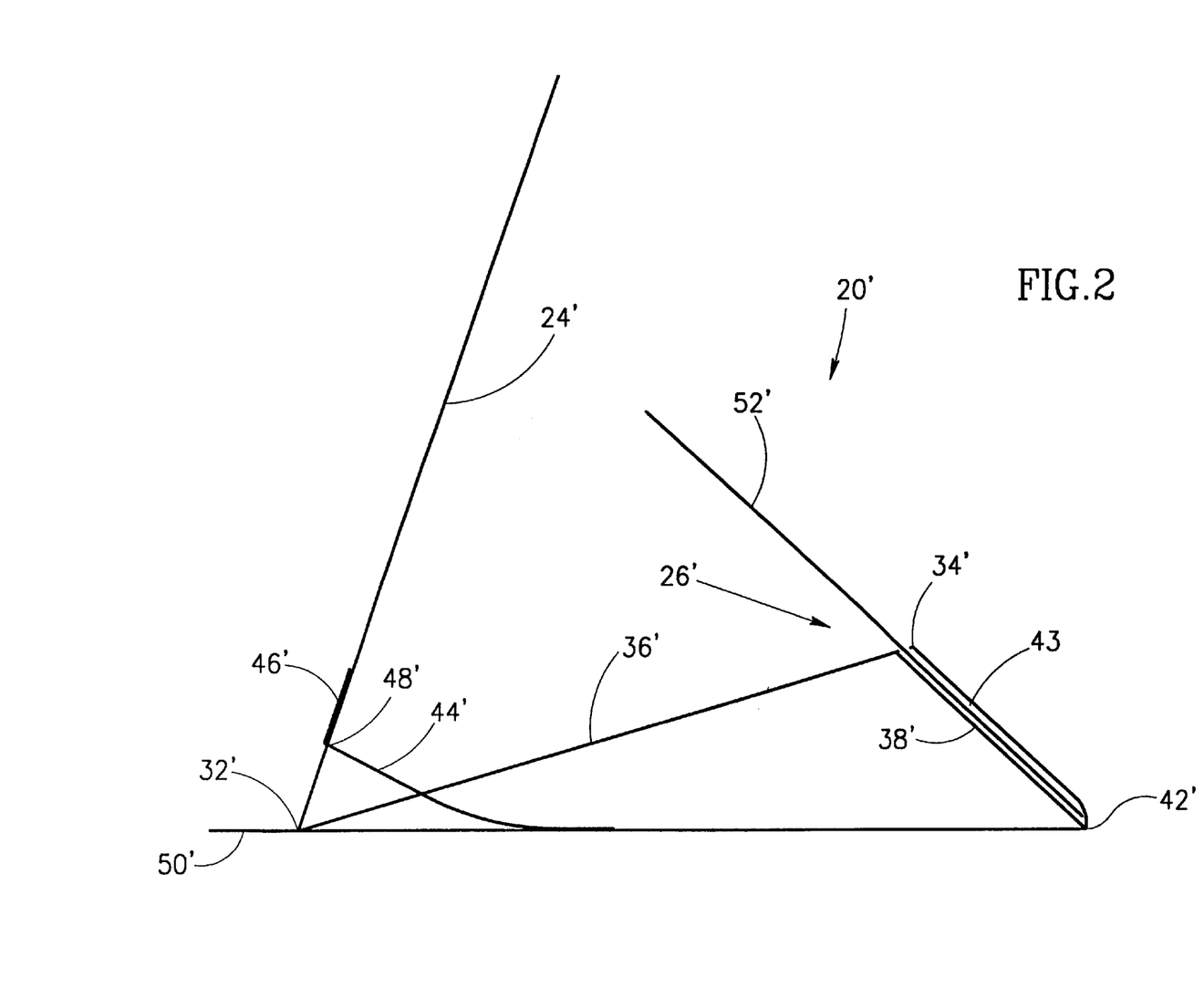
FIG. 2 is a side view of another embodiment of a container of the invention, at the same state as shown in FIG. 1D, the difference residing in the structure of the item holding member.

Reference is now being made to FIG. 2, which shows a container 20' according to another embodiment of the invention, shown in a side view similarly to that seen in FIG. 1D. In FIG. 2, all like elements to those of FIG. 1 have been given the same reference numerals, with a prime indication. The embodiment of FIG. 2 differs from the embodiment of FIG. 1 in that the object retaining member is a pocket 43 formed on the upper face of portion 38' of item holding member 26'. In other respects, container 20' is functionally equivalent to container 20.

Figure 3A:
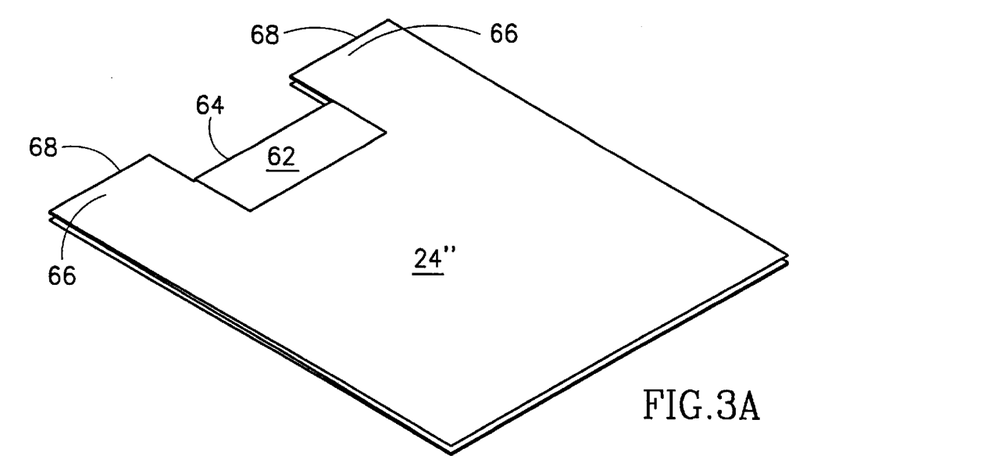
FIG. 3 shows a container in accordance with another embodiment of the invention in the same three states as in the embodiment of FIG. 1.
Figure 3B:
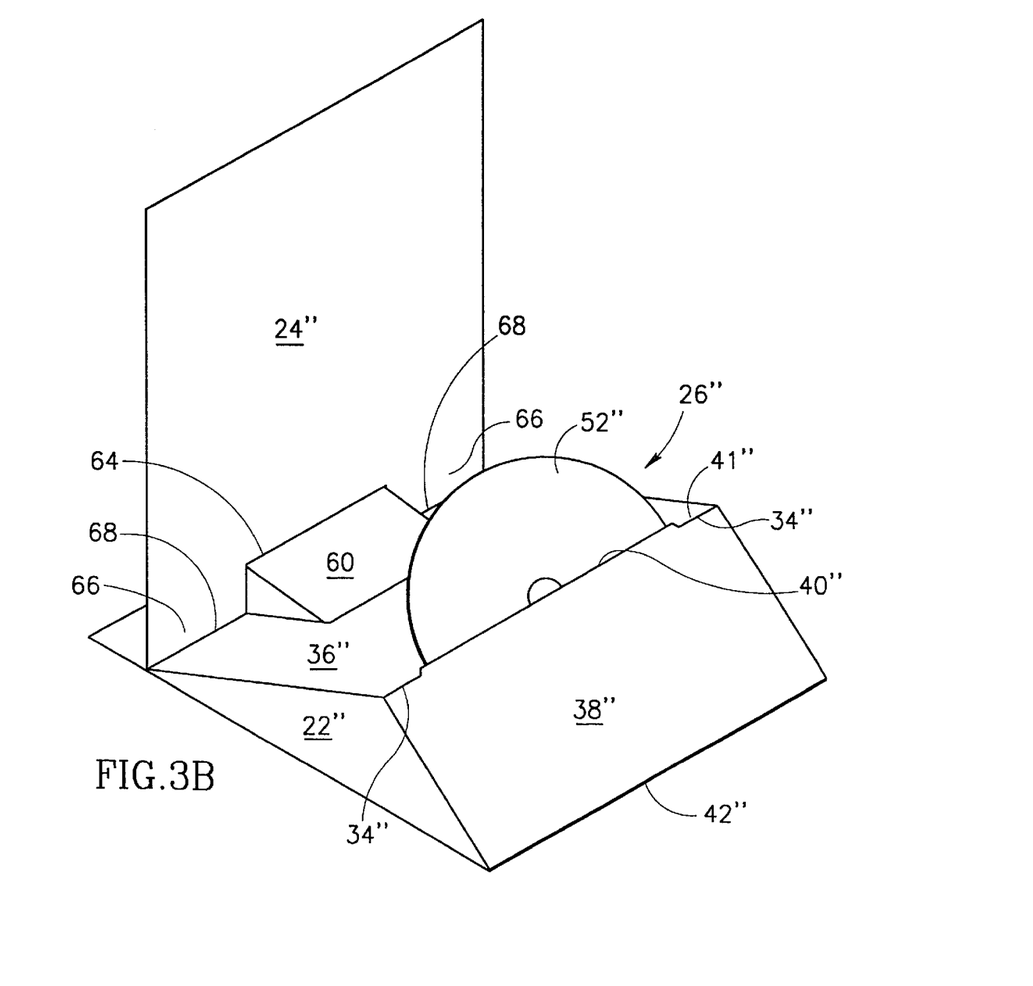
Figure 3C:
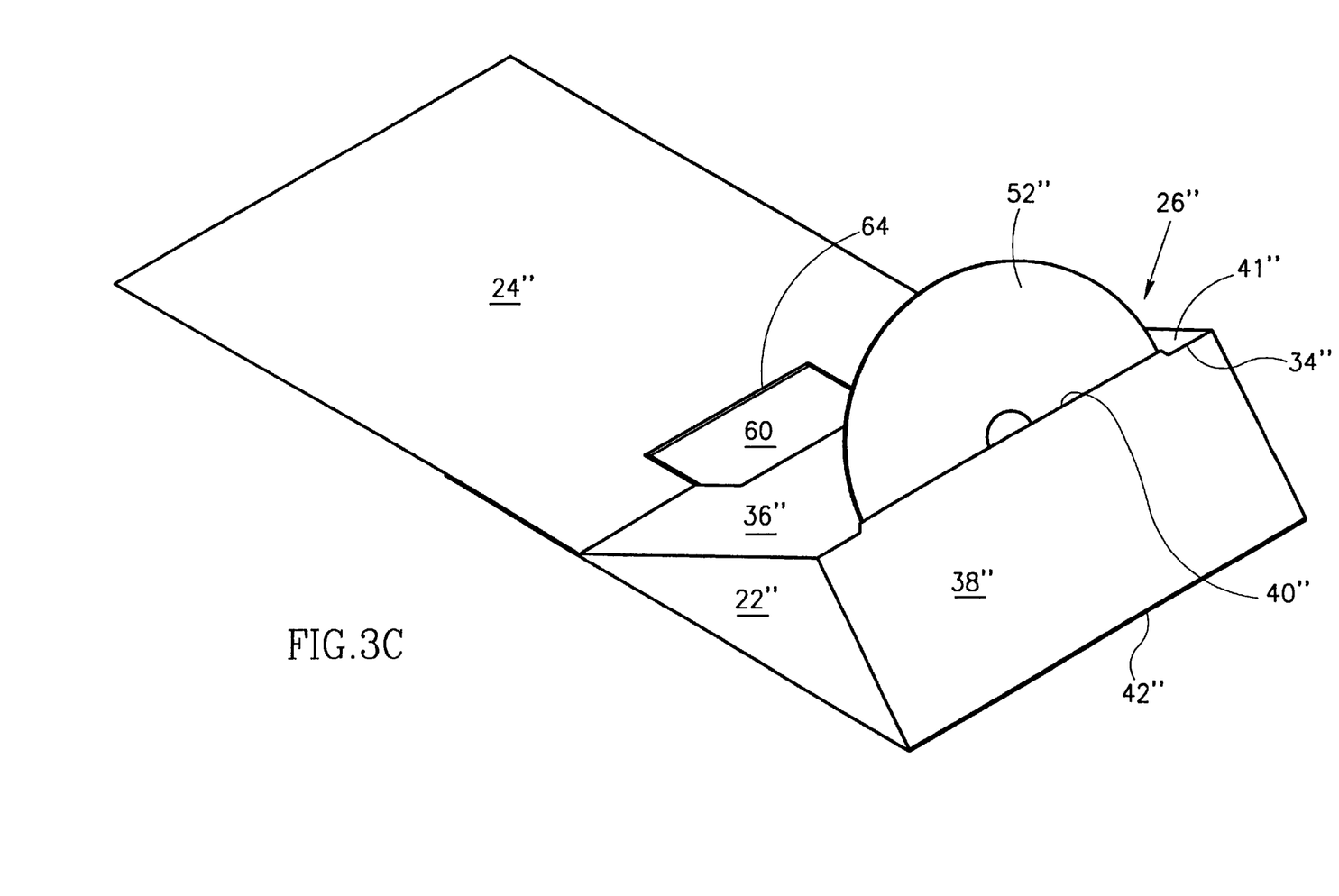

Another embodiment of the invention is shown in FIG. 3. This embodiment is functionally similar to the embodiment shown in FIG. 1 and accordingly like elements have been given a like reference numeral with a two prime indication. This embodiment defers from that of FIG. 1 in that the base member 22" has a central portion 60 formed with a terminal flap 62, defined by two slits 63 and fold line 64, which is attached, e.g. by adhesion, to a top face of cover 24"; and in that cover 24" and item holding member 26", are connected by two corresponding peripheral portions 66 defining a fold line 68. Slits 63 also define two peripheral portions 65. All other elements are similar to those of the embodiment of FIG. 1, with the two embodiments being functionally equivalent. The reader is thus referred to the description of the embodiment of FIG. 1 for a complete explanation of the function.

Figure 4:
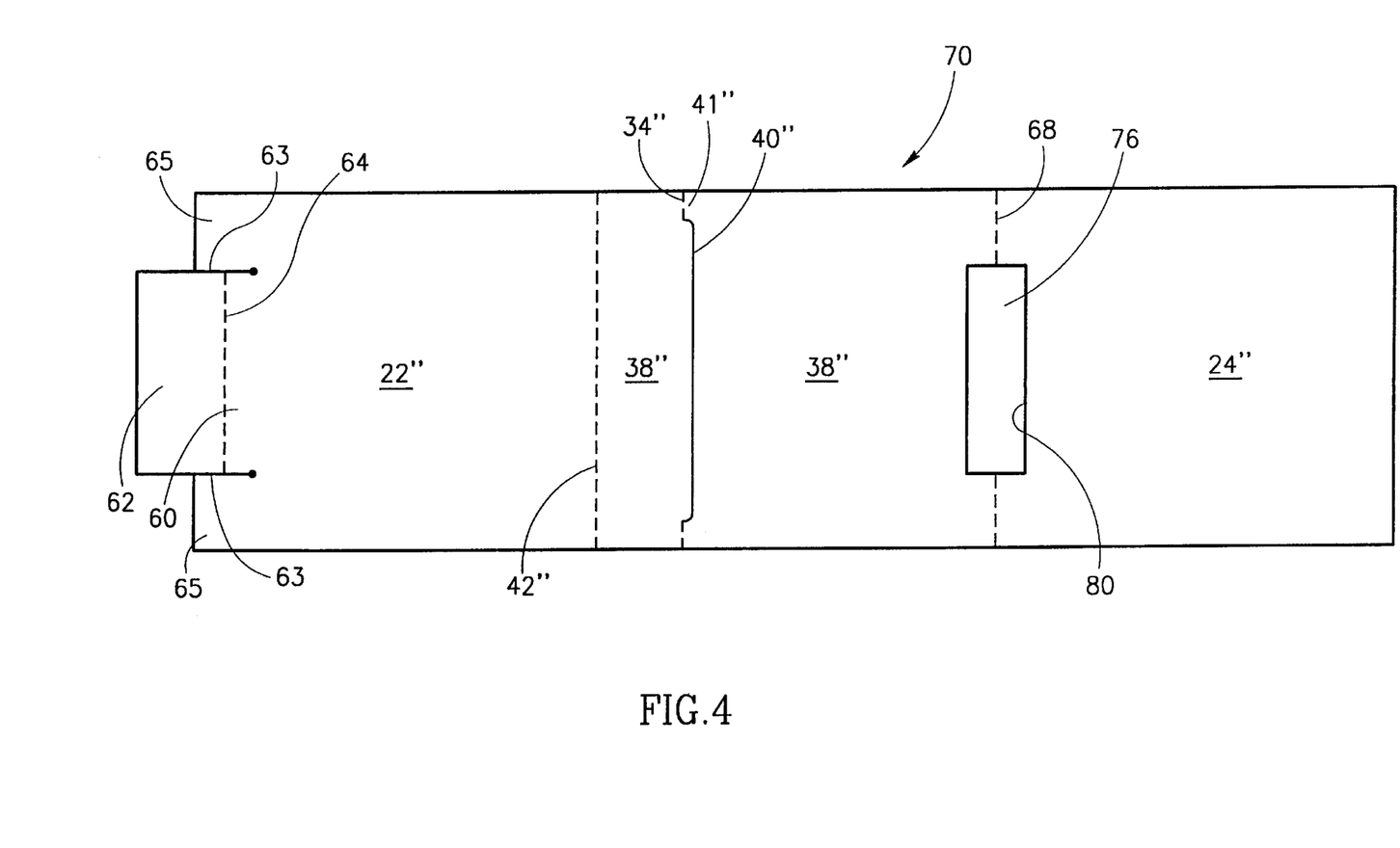
FIG. 4 shows a single piece blank used for forming a container of the embodiment of FIG. 3.

FIG. 4 shows a blank 70 useful for construction of a container of the embodiment shown in FIG. 3. The reference numerals in FIG. 4 identify the various elements of the container which can be seen in the constructed state in FIG. 3. Also seen in FIG. 4 is a rectangular opening 76 corresponding in width to flap 62 formed between the rear end. Furthermore, it can also be seen in FIG. 4 that the flap is also defined by two cuts 78 normal to the fold lines. For construction of the container shown in FIG. 3, the blank is folded downwardly, about fold line 42" and upwardly about fold line 68 and then flap 62 is attached to the top face (the bottom face in the view shown in FIG. 4) of cover member 24", with the fold line 64 being lined with edge 80 of opening 76. It will be appreciated that opening 76 is provided to allow a relative interim upward movement of flap 62 required to reach the state shown in FIG. 3B.

Furthermore, peripheral portions 65, which extend rearward to fold line 64, serve a similar function to rearward extending central portions 50 of container 20 shown in FIG. 1.

Figure 5:
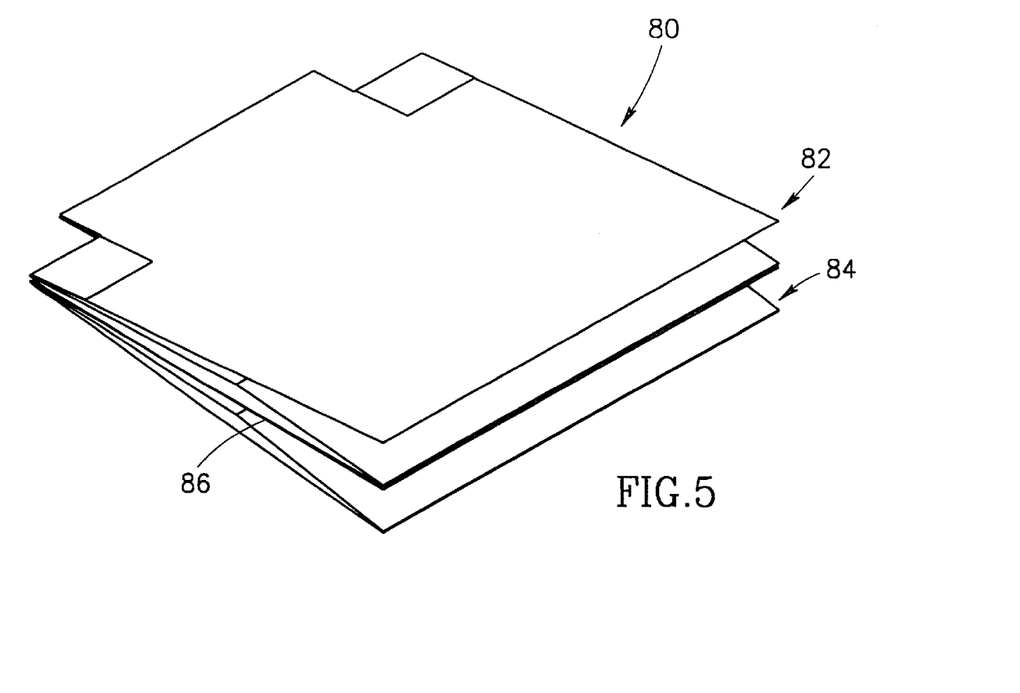
FIGS. 5 and 6 show two containers for the storage and display of two compact discs, wherein in FIG. 5 the two compact discs are stored and displayed in the same orientation and in FIG. 6 in an opposite orientation.
Figure 6:
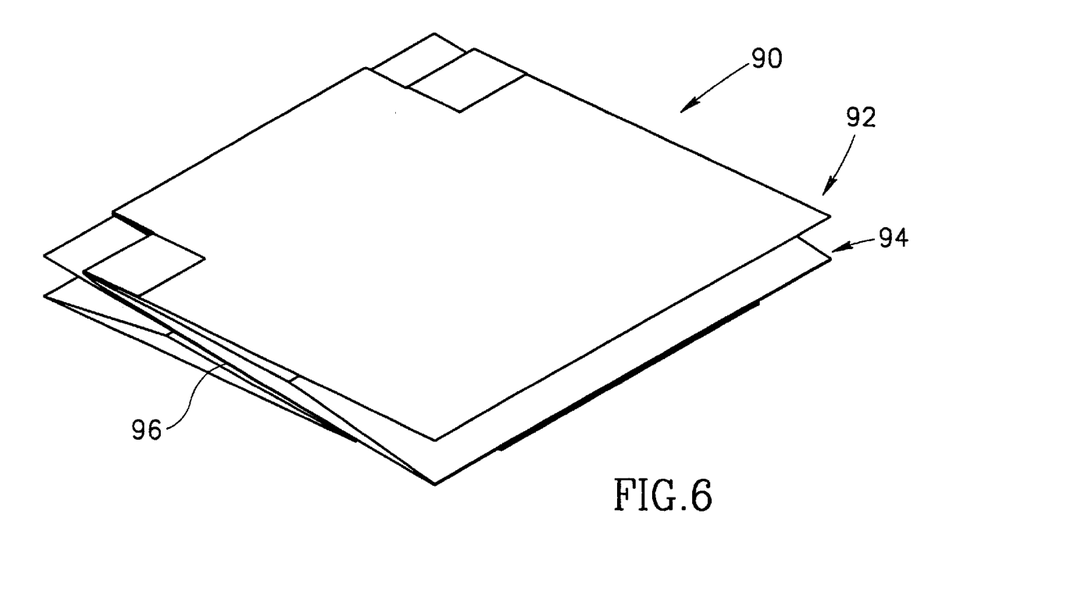
Figure 7:
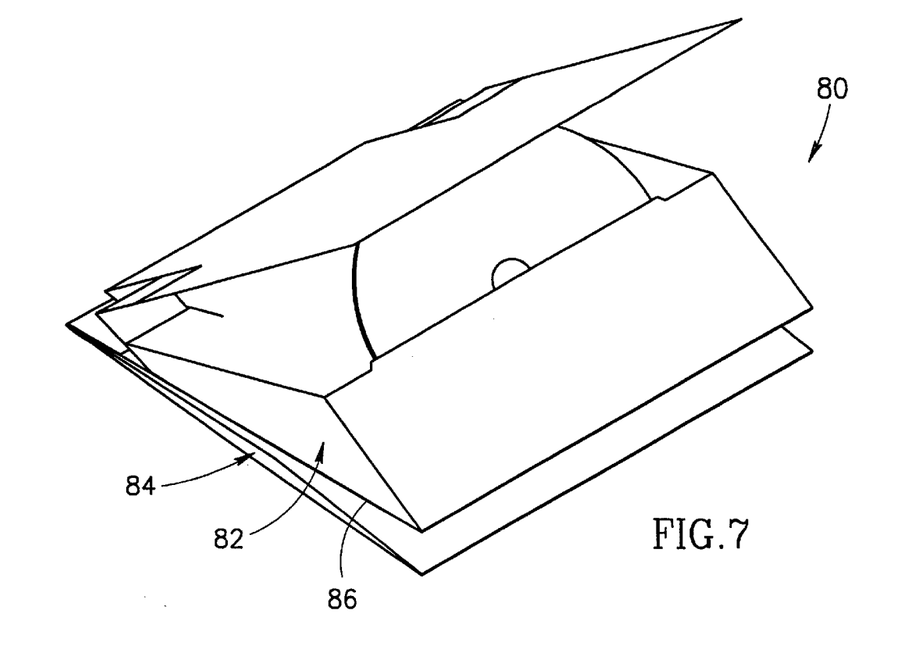
FIGS. 7 and 8 show the containers of FIGS. 5 and 6, respectively, in a partially open state.
Figure 8:
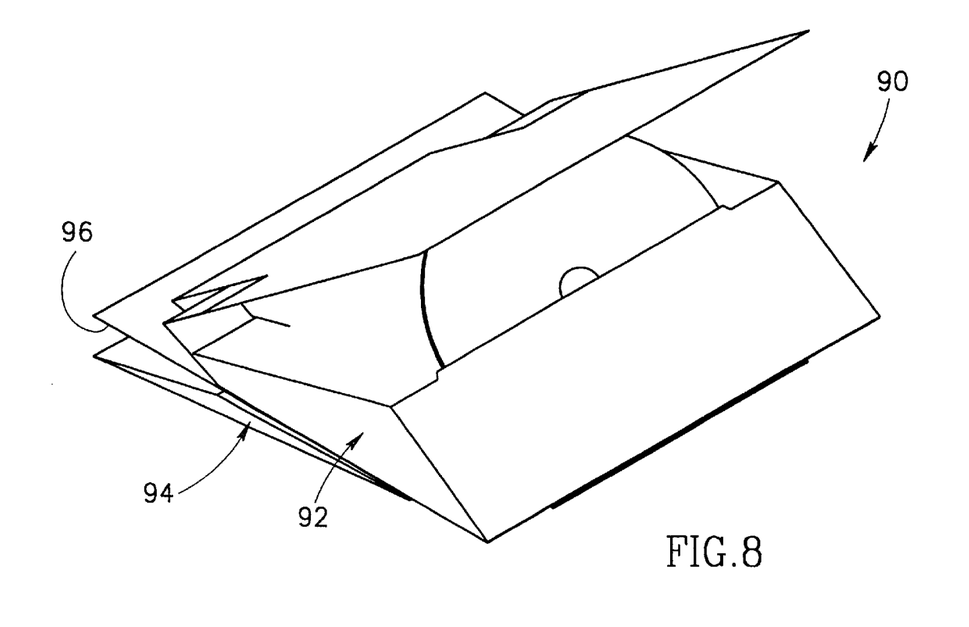

FIGS. 5–8 show two containers 80 and 90 adapted for holding each two planar items, these containers being shown in a essentially closed state in FIGS. 5 and 6 and in a partial open state in FIGS. 7 and 8, respectively. Each of containers 80 and 90 has in fact two functional units, 82 and 84 and 92 and 94, respectively, each of which has a construction and function similar to the embodiment of FIG. 1. In containers 80 and 90, the base member 86 and 96 serve as the cover member of functional units 84 and 94, respectively. The difference between containers 80 and 90 resides in that while the two items in container 80 are retained in the same orientation, they are retained in opposite orientations in container 90.

Figure 9:
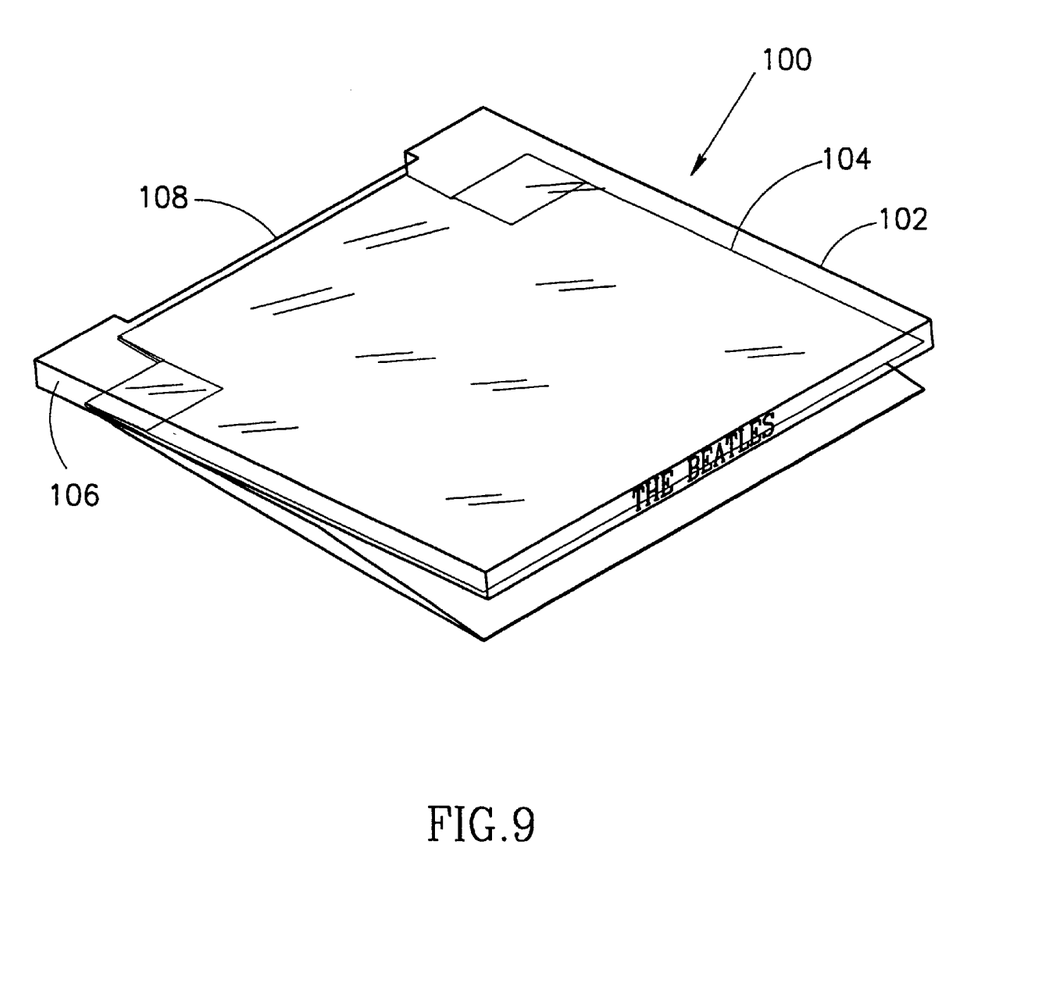
FIG. 9 shows an embodiment of a container having a hard plastic cover.

Another embodiment of the invention is shown in FIG. 9. This container 100 is essentially similar to container 20 shown in FIG. 1, with the addition of a rigid plastic cover 104 overlaying cover member 102. Cover 104 has side edges 106 which in the closed state, receive and retain all members of container 100. Side edges 106 are sufficiently wide so as to allow printing of relevant data thereon, such as the contents of the container, as illustrated in FIG. 9. Cover 102 has a rectangular recess 108 at its rear end, to allow interference-free pivoting movement of cover member 104 during opening or closing.

Figure 10A:
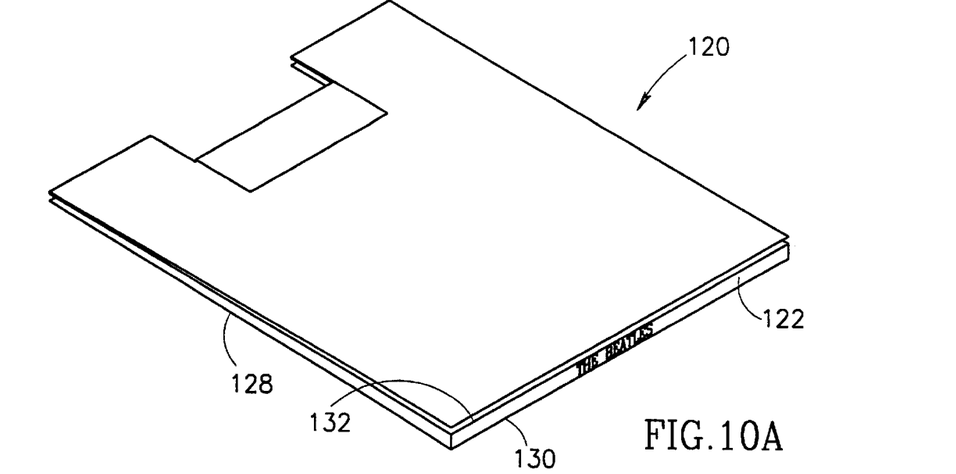
Figure 10B:
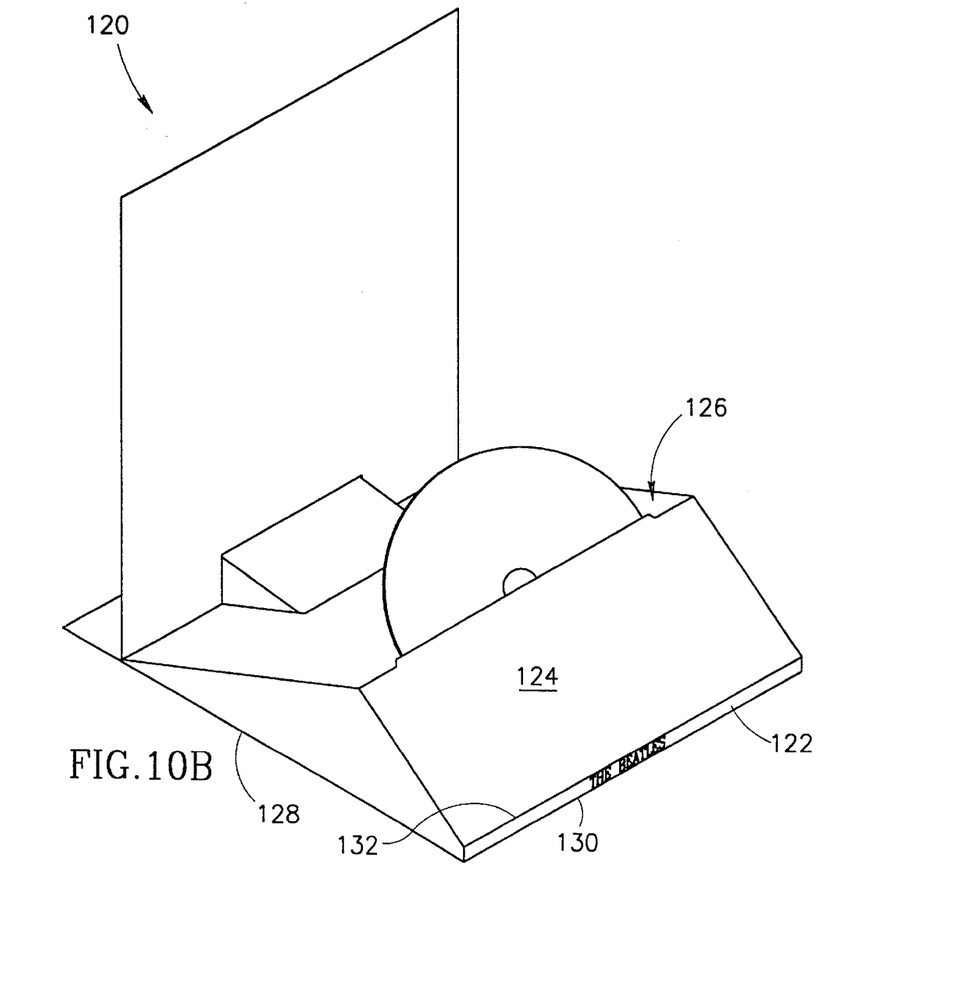

Further reference is now made to FIG. 10 of the drawings in which the container generally designated 120 and which is essentially similar to the container of FIG. 3 and further comprises an additional side portion 122 intermediate portion 124 of item holding member 126 and a front end of base member 128, where the side portion 122 is pivotable with respect to the base member 128 about a fold line 130 and with respect to the portion 124 about a fold line 132. The side portion 122 is sufficiently wide for printing thereon different data, such as the, title of the compact disc retained in the container, etc.

Figure 11A:
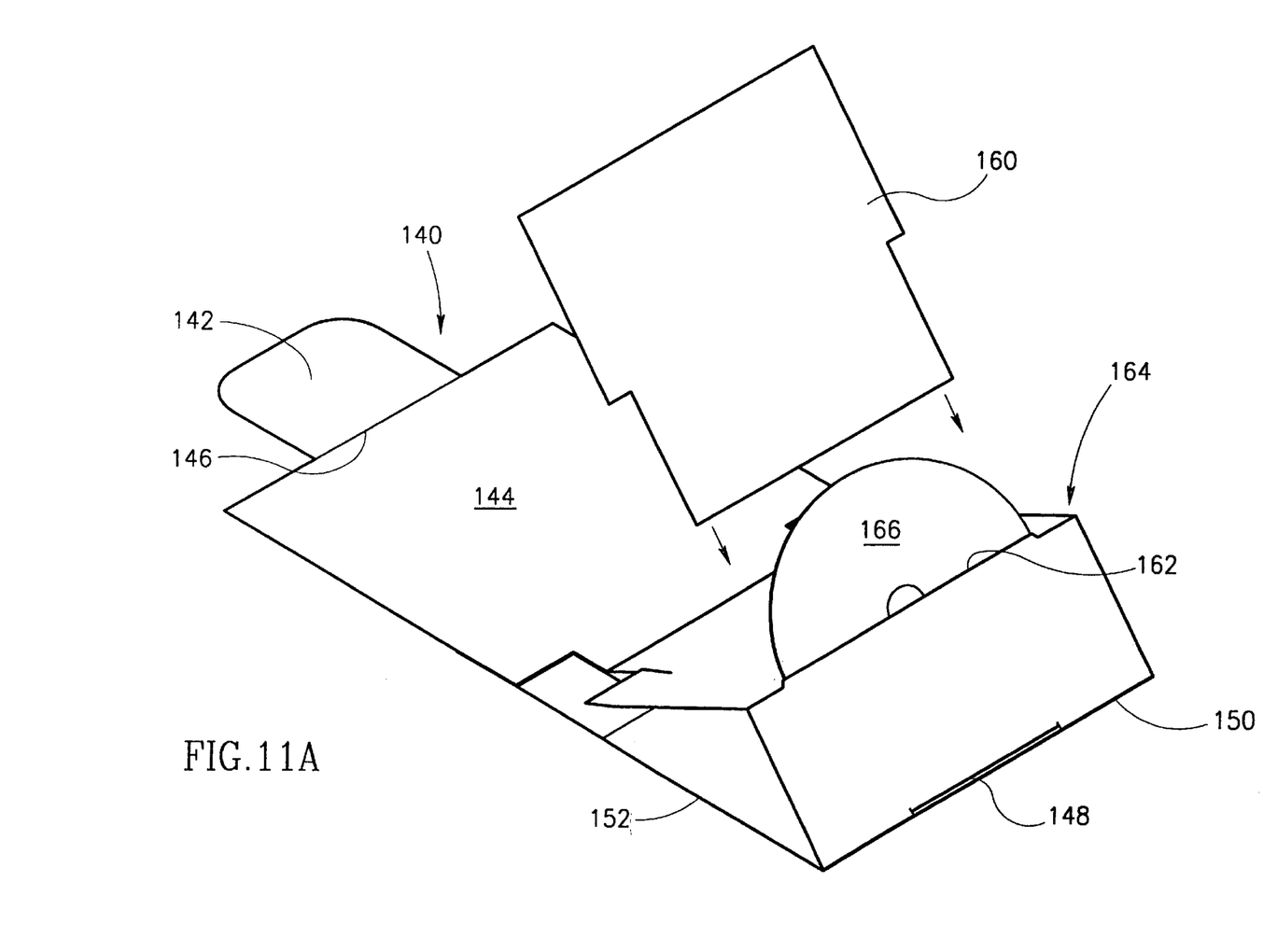
FIG. 11A is an isometric view of a container similar to the container of FIG. 1 and further comprising closing means and a brochure/support member, wherein in FIG. 11A the brochure/support member is shown removed from the container and in FIG. 11B the brochure/support member is received within the container.
Figure 11B:
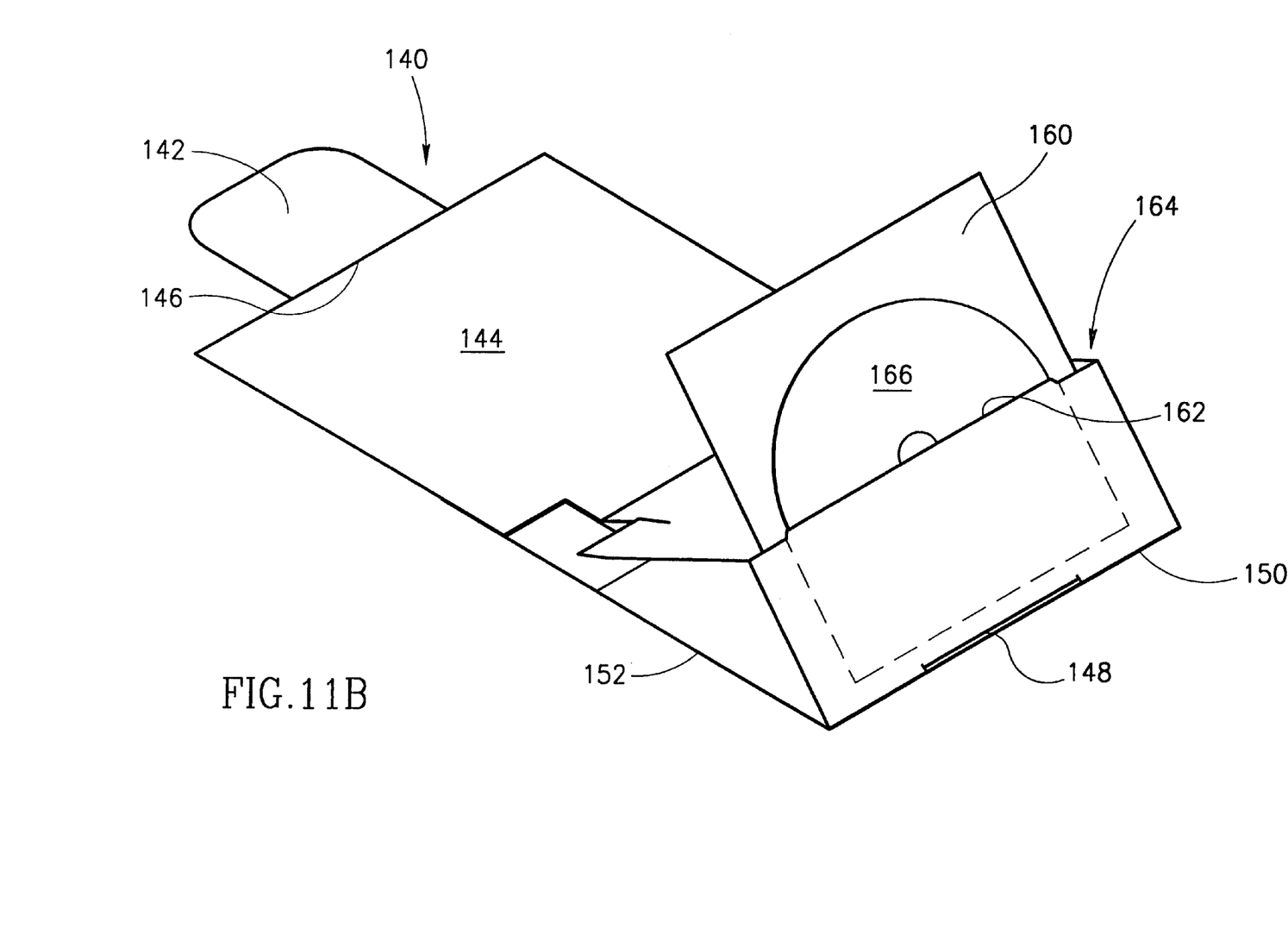

The embodiment of FIG. 11 is similar to that of FIG. 1 with the addition of closing means 140 which is a tongue portion 142 integral with cover 144 and hangable thereto over fold line 146. A corresponding slit 148 is formed along a portion of fold line 150 suitable for receiving the tongue 142 when the container is in its closed position, for preventing spontaneous opening thereof. It should be appreciated that the slit 148 may also be formed at a front edge of the base portion (not shown). Alternatively, the tongue portion 142 may be removably fastened to the base member 152 by a attaching means such as an adhesive patch or a hock and pile fastener, as known per se.

As can further be seen in FIG. 11, there is provided a brochure 160 for inserting into slit 162 of the item holding member 164. The brochure may be in the form of a booklet containing information related to the compact disc 166 received in the container (or instruction manual in case of a software). The brochure may also be in the form of a rigid board made for example of cardboard, and useful for supporting the disc 166. In FIG. 11A the brochure 160 is shown prior to insertion into slit 162 and in FIG. 11B the brochure is received within the slit 162 together with a compact disc 166.

We claim:

1. A container for storage and display of at least one essentially flat planar item, comprising three planar members including a base member, a cover and an item holding member which is intermediate between the base member and the cover; one end of the cover being folded about a first fold line at a rear end of the base member and about a second fold line to the item holding member, the cover being swingable about the two fold lines between an opened state and a closed state; the item holding member being pivotly connected to a front end of the base member along a third fold line, and comprising two portions pivotly connected to one another along a fourth fold line, and item holding means for holding the item such that at least a portion of the item is retained flush against one of the two portions of the item holding member; fold lines being arranged such that in the closed state the first fold line is rearward with respect to the second fold line, whereby during opening of the cover the first fold line slides to a position forward to said second fold line giving rise to swinging of the two portions of the item holding member about the third fold line whereby said item erects.

2. A container according to claim 1, wherein all fold lines are essentially parallel to one another.

3. A container according to claim 1, wherein the base member, the cover and the item holding member, are made from a single, folded blank.

4. A container according to claim 1, wherein the item holding member is formed with a slit adapted for insertion of a portion of a flat item, which slit extends between two side portions, with the fourth fold line being formed in said two side portions.

5. A container according to claim 4, wherein the item holding member comprises a pocket attached to the face of the item holding member facing said base member and having an opening facing the slit, and being adapted to receive a portion of the flat item inserted through the slit.

6. A container according to claim 4, wherein the item holding member comprises a pocket formed on the face thereof facing the cover, with an opening directed towards said fourth fold line, the pocket being adapted to receive a portion of said planar item.

7. A container according to claim 1, wherein said, one end of the cover has two peripheral portions with, attached to or integral with corresponding portions at a rear end of the base, with said first fold line formed in said peripheral portions, and has a central portion attached to or integral with a corresponding central portion of the rear end of the item holding member, with the second fold line formed in said central portion.

8. A container according to claim 1, wherein said one end of the cover has a central portion attached to or integral with a corresponding central portion of a rear end of the base, with said first fold line formed in said central portion, and has two peripheral portions attached to or integral with corresponding peripheral portions at the rear end of the item holding member, with said second fold line formed in said peripheral portions.

9. A container according to claim 1, for storage and display of two or more planar items.

10. A container according to claim 1, comprising two or more functional units, each of which being adapted to receive and contain one planar item and having properties as those defined in claim 1, the two functional units arranged such that a base member of one serves as the cover of another.

11. A container according to claim 1, comprising an additional rigid cover member attached to the cover member and having side walls such that it is adapted to receive all members of the container within the space confined by it.

12. A container according to claim 11, wherein at least one side wall of the rigid cover member presents information related to the contents of the container.

13. A container according to claim 1, further comprising a side portion intermediate the item holding member and a front end of the base member, the side portion being pivotable with respect to the base member about said third fold line and with respect to the item holding member about a fifth fold line.

14. A container according to claim 1, further comprising a closing arrangement for preventing spontaneous opening of the container.

15. A container according to claim 14, where said closing arrangement is a tongue member extending from a free end of the cover and being retainable by a corresponding slit formed at or adjacent a front edge if the base member.

16. A container according to claim 1, wherein a brochure is received within the item receiving member.

* * * * *